United States Patent
Mellor et al.

(10) Patent No.: US 6,594,029 B1
(45) Date of Patent: Jul. 15, 2003

(54) GUARD-BANDING METHODS, DYNAMIC GUARD-BANDING METHODS, AND RELATED APPARATUS FOR REAL TIME IMAGE-DATA PROCESSING

(75) Inventors: Douglas J. Mellor, Meridian, ID (US); Steven H. Taylor, Boise, ID (US); Richard M. Dow, Laramie, WY (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/294,831

(22) Filed: Apr. 19, 1999

(51) Int. Cl.$^7$ ............................................... G06F 15/00
(52) U.S. Cl. ...................... 358/1.15; 358/1.16; 358/1.5; 358/448
(58) Field of Search ........................... 358/1.1, 1.2, 1.6, 358/1.9, 1.13, 1.15, 448, 452, 1.5, 1.14, 1.16, 1.17; 382/303–304

(56) References Cited

U.S. PATENT DOCUMENTS

| | | | |
|---|---|---|---|
| 5,129,049 A | 7/1992 | Cuzzo et al. | 395/113 |
| 5,444,827 A | 8/1995 | Briggs et al. | 395/115 |
| 5,450,562 A | 9/1995 | Rosenberg et al. | 395/446 |
| 5,459,818 A | 10/1995 | Grant et al. | 395/114 |
| 5,463,776 A | 10/1995 | Voigt et al. | 395/600 |
| 5,479,587 A | 12/1995 | Campbell et al. | 395/116 |
| 5,524,186 A | 6/1996 | Campbell | 395/115 |
| 5,592,211 A * | 1/1997 | Porter et al. | 347/260 |
| 5,781,707 A | 7/1998 | Kunz et al. | 395/105 |

* cited by examiner

Primary Examiner—Mark Wallerson

(57) ABSTRACT

Methods of guard-banding, methods of dynamic guard-banding, and related apparatus for real time image-data processing are described. In one embodiment, at least one image-processing pipeline variance is measured. Responsive to measuring the image-processing pipeline variance, a guard band is imposed around a processing parameter of the image-processing pipeline. In another embodiment, a first parameter relating to processing time of a predetermined amount of data through an image-processing pipeline is determined. A second parameter relating to processing time of the predetermined amount of data through the image-processing pipeline is determined. The second parameter is related to the first parameter. The first and second parameters are compared, and responsive thereto, a guard band is imposed on at least a portion of the processing which takes place in the image-processing pipeline. In preferred embodiments, the guard bands are adjustable dynamically or on-the-fly.

23 Claims, 9 Drawing Sheets

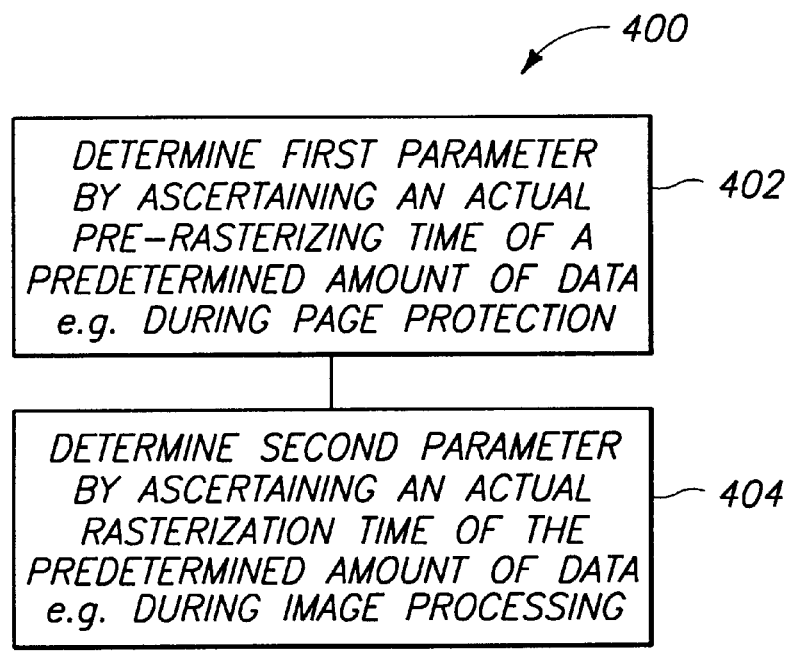
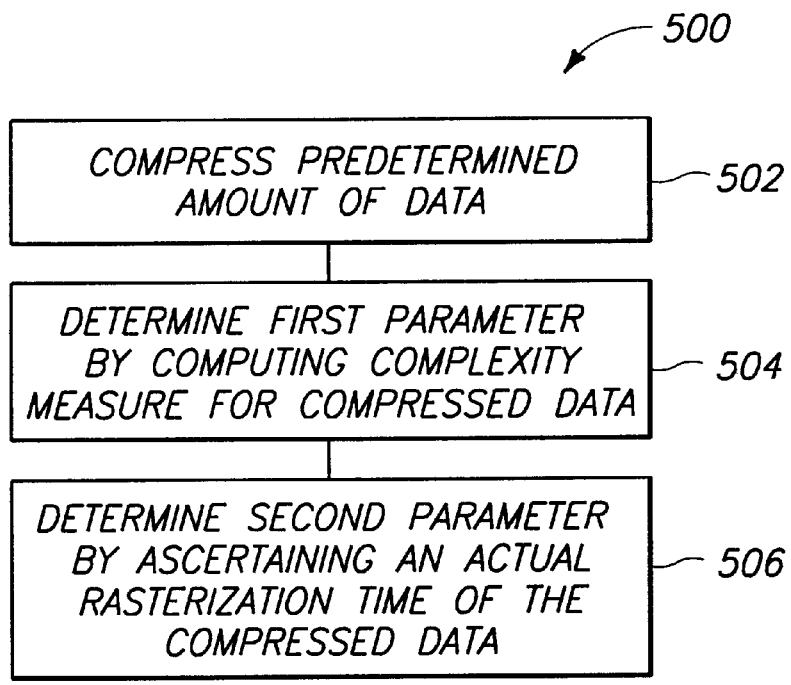

GUARD-BANDING METHODS, DYNAMIC GUARD-BANDING METHODS, AND RELATED APPARATUS FOR REAL TIME IMAGE-DATA PROCESSING

FIELD OF THE INVENTION

This invention pertains to guard-banding methods, to dynamic guard-banding methods, and related apparatus for real time image-data processing. The invention pertains particularly to peripheral units, such as laser printers.

BACKGROUND OF THE INVENTION

In the past, peripheral units such as laser printers have typically captured an entire page before any image is placed on paper. The term "peripheral unit" as used in this document shall include, without limitation, any type of peripheral unit which produces a hard copy output or print media, e.g. laser printers (color or monochrome), copiers, facsimile devices, plotters, ink jet based devices, and the like. In such laser printers, formatting is either performed on the host computer (with large volumes of rasterized data being shipped to the printer), or on a formatter within the printer. Since a laser printer print engine operates at a constant speed, if new rasterized data is not available at a rate that keeps up with the engine's operation, a print "overrun" or so-called "punt" occurs and the page is not printable. Various methods for addressing print overrun situations are described in U.S. Pat. No. 5,479,587, the disclosure of which is incorporated by reference herein. Various other aspects of printers are described in the following U.S. patents, the disclosures of which are incorporated by reference: U.S. Pat. Nos. 5,450,562, and 5,459,818.

Modern printers often use firmware-driven, microprocessor-controlled formatters to control the operation of the printer. In systems where the data races the laser, so-called "punt protection" processes have been developed and employed on every page to ensure that the data keeps up with the engine speed. For example, after a page has been composed by a language-specific personality, but before it is released to the page-pipe-queue for printing by the engine, a punt protection process is employed. The punt protection process ensures that each page will race the laser in real-time, by assessing the complexity measure of each strip, and test-rasterizing the strip if necessary. If dictated by the complexity or the test-rasterization, the strip is transformed to a faster format in order to assure racing the laser, thus avoiding a punt in the real time printing of the page. Various aspects of overrun or punt protection are described in the following U.S. patents, the disclosures of which are incorporated by reference: U.S. Pat. Nos. 5,781,707, 5,129,049, 5,444,827, and 5,524,186.

For purposes of understanding various problems associated with past processing techniques relative to printers and the like, a somewhat high level block diagram describing a system configured to process image data is shown generally at 20 in FIG. 1. System 20 typically includes a so-called image pipeline which processes image data provided by a host into a form which is suitable for use by a printer engine. The image pipeline comprises a number of different elements which can be implemented in any suitable hardware, software, or firmware. In this example, image pipeline 22 includes an interpreter 24, a graphics engine 26, a canvas 28, at least one page protection process 29, and an image processor 30. An engine 32 is provided and comprises, in this example, a print engine such as would be found in a laser printer.

Typically, image data or a file gets sent to system 20 via an I/O port (not specifically designated). In a typical personal computer scenario, a print job will load through an operating system such as Windows, to a driver and will be sent out a parallel port. The print job need not, however, come from a personal computer. Rather, it can come from a mainframe, from work stations, or from other devices. In addition, it need not have parallel porting. Rather, it can come through infrared ports or LANs that show other I/O type ports, to name just a few. The print job is received by interpreter 24 which then operates upon the print job in a known manner. At the interpreter level, the print job is parsed and a job stream is formed to determine what operations are being specified. Interpreter 24 is in communication with graphics engine 26 and communicates to the graphics engine what operations are being specified. Graphics engine 26 operates on information received from interpreter 24 by doing such things as ensuring that the information does or does not have to be clipped. Additionally, if a particular structure specified by interpreter 24 needs to be filled, it determines what area has to be filled and the like. If a particular structure specified by interpreter 24 needs to be stroked, it determines what area and what objects are to be used for stroking.

Canvas 28 is provided and is in operable contact with graphics engine 26. The graphics engine 26 sends the resulting object onto canvas 28 for processing. The graphics engine 26 communicates to canvas 28 a description of the object it has operated upon. Canvas 28 breaks up information received from the graphics engine into smaller amounts of data. In this example these smaller amounts of data are known as strips. Strips are also known as work requests. Accordingly, at the canvas level, work requests are built and each work request will be unique to each strip, or perhaps duplicated across strips.

Page protection process 29 contains at least one algorithm which is directed to ensuring that all strips will meet the processing times imposed by the engine 32 on image processor 30. Various exemplary algorithms are described in one or more of the patents incorporated by reference above.

Image processor 30 is coupled with canvas 28 and will eventually receive the work requests from canvas 28 and start imaging them or rendering them into bits. The rendering of strips into bits results in formation of a raster bit map. The raster bit map is used to drive print engine 32 for rendering an image. The above description constitutes but one exemplary system which can be utilized to process image data into a form suitable for use by a print engine. More detailed information about the operation of systems, such as system 20, can be found in the patents incorporated by reference above. In addition, while the interpreter 24, graphics engine 26, canvas 28, and image processor 30 are shown as discrete elements, such need not be the case.

This invention arose out of concerns associated with providing improved overrun or punt protection, punt-margining, punt-margin-trouble shooting, and performance-tuning of various punt protection algorithms.

SUMMARY OF THE INVENTION

Methods of guard-banding, methods of dynamic guard-banding, and related apparatus for real time image-data processing are described. In one embodiment, at least one image-processing pipeline variance is measured. Responsive to measuring the image-processing pipeline variance, a guard band is imposed around a processing parameter of the image-processing pipeline. In another embodiment, a first parameter relating to processing time of a predetermined amount of data through an image-processing pipeline is determined. A second parameter relating to processing time of the predetermined amount of data through the image-processing pipeline is determined. The second parameter is related to the first parameter. The first and second parameters are compared, and responsive thereto, a guard band is imposed on at least a portion of the processing which takes place in the image-processing pipeline. In preferred embodiments, the guard bands are adjustable dynamically or on-the-fly.

DESCRIPTION OF THE DRAWINGS

FIG. 12 is a flow diagram which describes a method in accordance with one or more embodiments of the present invention.

FIG. 13 is a flow diagram which describes a method in accordance with one or more embodiments of the present invention.

DETAILED DESCRIPTION OF THE INVENTION

Figure 1:
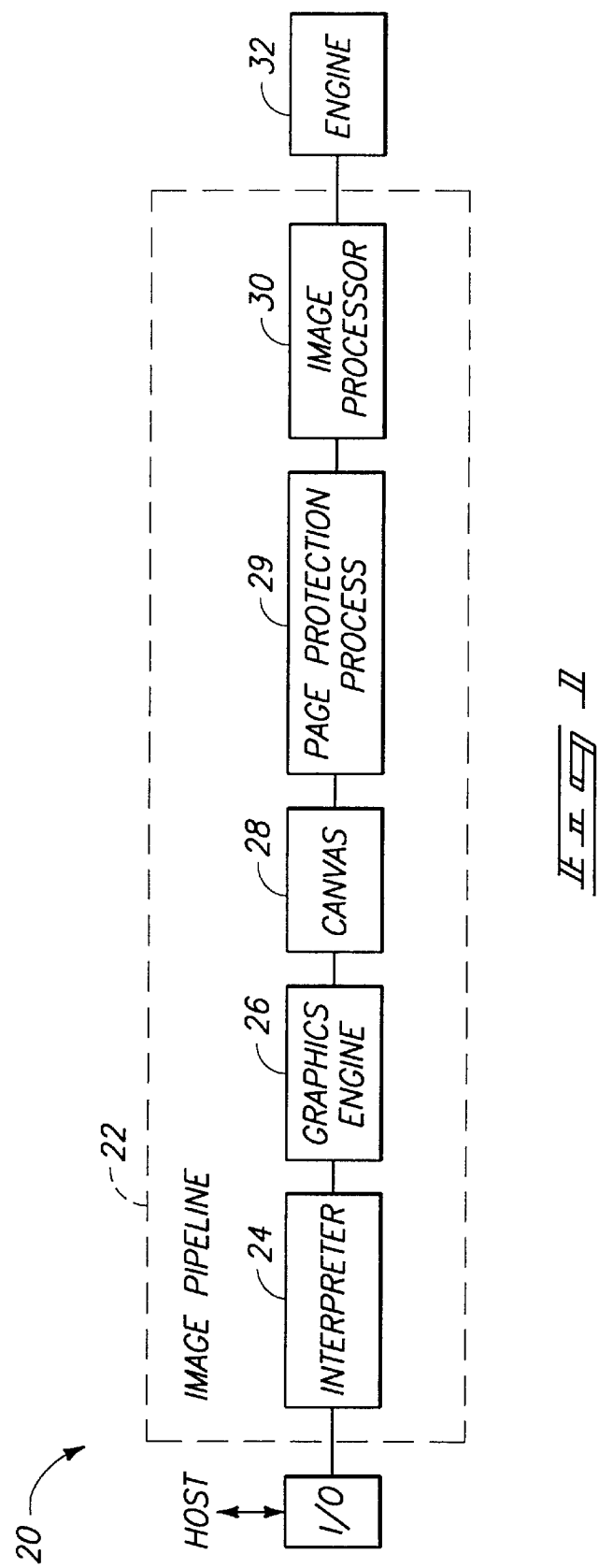
FIG. 1 is a high-level block diagram of an image-processing pipeline suitable for use with one or more embodiments of the present invention.

For purposes of understanding the various embodiments of the invention described below, a flow diagram is set forth generally at 34 in FIG. 2. The flow diagram describes a decision making process which is directed to assuring that each strip, band, or predetermined amount of data will be available to race the laser so as to avoid page overruns or so-called punts. The various methods described just below can be implemented in any suitable hardware, software, or firmware. Exemplary systems which are suitable for use in connection with the methods described just below are described in one or more of the patents incorporated by reference above. Hence, the discussion appearing just below is best understood in the context of the patents incorporated by reference above.

At 36, each band or strip is analyzed to determine whether subsequent processing needs to be done in order to avoid punts. At 38, a determination is made as to whether rasterization is predicted to be needed for punt avoidance. Such is preferably accomplished by assessing or computing a complexity measure of each strip or band. The complexity measure is a computed predictive measure of how long rasterization will take in real time based upon looking at the number and types of objects that are on the display list or in the strip at a particular moment. If, as a result of the analysis at 38, it appears that rasterization is needed to avoid a punt, pre-rasterization and compression buffers are allocated at 40 and the strip is pre-rasterized at 42.

During pre-rasterization, the time required to pre-rasterize is measured and assigned a variable which, in this example, is represented by "TR". At 44, the pre-rasterization time TR is assessed to determine whether it is larger than the time required to race the laser so as to avoid a punt. If the pre-rasterization time TR is larger than the race time, then, at 46, the band is compressed and at 48 the original display list is freed up because the pre-rasterized compressed strip is now going to be substituted for the original strip. The compressed band is then stored in memory for subsequent processing. At 50, the pre-rasterization and compression buffers are freed up because the pre-rasterized and compressed version of the strip is placed into a new strip. With the pre-rasterized and compressed strip, at 52, a complexity is computed to ascertain whether there will be any extra time left over when the new strip is processed to the print engine. If there is extra time, then the surplusage can be used for the next strip. In other words, the decision at 52 can enable time sharing between the various strips. At 53, a determination is made as to whether there are any more strips or bands on the current page. If there are not, the routine ends. If there are, an advance is made to the next band at 54 and the process is again initiated at step 36.

Variances

In the process just described, there are variances between the different measures of time that a particular predetermined amount of data, or, in this example, a strip will take to render throughout the process. If these variances are not taken into account, then the probability of having an overrun or a punt increases. The process just described does not recognize or compensate for any variances which might occur during processing.

For exemplary purposes only, three specific different variances are discussed and described below. It will be understood by those of skill in the art that these particular variances are specific to the system described by flow diagram 34. Accordingly, the invention is not intended to be limited to these specific variances or the system within which they occur.

Figure 3:
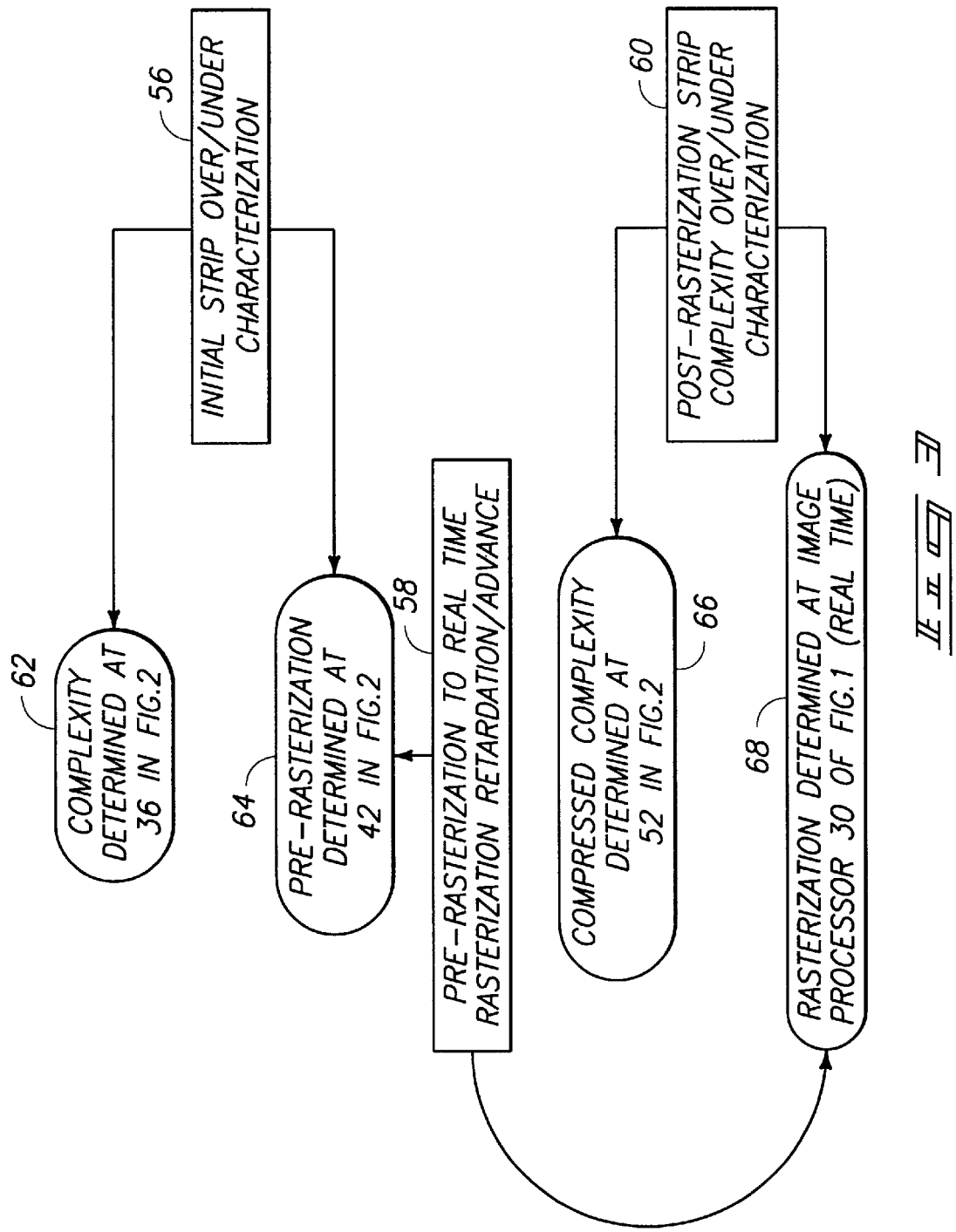
FIG. 3 is a high-level conceptual diagram illustrating three variances which can occur in connection with the decision making described by FIG. 2.

FIG. 3 shows three exemplary variances at 56, 58, and 60 respectively. Variance 56 relates to the "initial strip over/under characterization". Variance 58 relates to the "pre-rasterization to real time rasterization retardation/advance". Variance 60 relates to the "post-rasterization strip complexity over/under characterization". Each variance 56, 58, and

60 is shown to be related to two different measures of rasterization time. These different measures are set forth at 62, 64, 66, and 68 and described in more detail below.

Initial Strip Over/Under Characterization

Variance 56 recognizes that the computed complexity 62 (corresponding to decision box 38 in FIG. 2) may not be as accurate as desired. Recall that the computed complexity describes a predictive measure of how long a strip or predetermined amount of data is going to take for pre-rasterization or rasterization. If an incoming strip is rasterized, as at pre-rasterization 64, the rasterization time generated by the rasterization can be compared with the complexity 62 and a variance can be assessed as a minimum, average, and maximum variance. So for example, if, as shown in FIG. 2 at 38, the complexity of the strip is under characterized, it will not be pre-rasterized, i.e. it will look to the system as if the strip will be able to be rasterized in real time without causing an overrun or a punt. If the strip is not pre-rasterized, then when real time rasterization occurs, the likelihood of a punt occurring on that particular strip is greater than if the strip were accurately characterized in the first place. Yet, if variance 56 is measured over several different work loads or several different print jobs, an accurate measure of the particular variance can be made on a minimum, maximum, and average basis. Based upon measurement of the variance, a guard band can be selected and placed around the variance or, more accurately, the processing parameter(s) responsible for creating the variance. For purposes of this document a "guard band" comprises an expanded tolerance which, by way of example, can comprise an adjustment in the algorithm which is utilized to analyze a particular predetermined amount of data which modifies the computed or calculated values by expanding them in a favorable direction. The algorithm can be implemented in or with any suitable software, hardware, or firmware. For example, let's say that a typical computed complexity, as computed at decision box 38 in FIG. 2, is found to underestimate the time required for rasterization by 10 milliseconds. Accordingly, if the computed complexity measures 15 milliseconds, then by virtue of the measured variance, we know that we should expand the complexity or, in other words, put a guard band around variance 56 (or the complexity computation) by adding 10 milliseconds to it. Accordingly, the computed complexity now takes into account the variance which occurs within the system thereby reducing the likelihood of a punt.

Pre-rasterization to Real Time Rasterization Retardation/Advance

With respect to variance 58, such variance is directed to measures and comparisons of the pre-rasterization time 64 (measured at 42 in FIG. 2) and the rasterization time 68 (when the strip or band is rasterized in real time). Variance 58 coincides with processing which is described in FIG. 2 at decision box 44. Here, recall, that a determination is made as to whether the pre-rasterization time is greater than the race time of the laser. If the pre-rasterization time is less than the race time, then, theoretically, the strip is adequate for processing and will not result in a punt. Yet, however, there are variances within this particular decision-making step which should be taken into account. Specifically, say that a strip is pre-rasterized at 42 (FIG. 2) and it is determined that it takes 50 milliseconds to do so. In the past, if this value was less than the race time, the strip would simply be passed through the image-processing pipeline and rasterized at the appropriate time, i.e. only at real time in image processor 30 of FIG. 1. Accordingly, it would not be compressed or further processed. Yet, the variance between pre-rasterization and real time rasterization can be significant. This particular variance is directed to determining the variances associated with the pre-rasterization and the actual real time rasterization, and adjusting the decision-making process, as at step 44 in FIG. 2, to address such variances. For example, if the pre-rasterization took 50 milliseconds, and it is found that the variance is generally 10 milliseconds over the pre-rasterization time, then an adjustment can be made at step 44 (FIG. 2) to add 10 milliseconds to the pre-rasterization time TR. Accordingly, such decreases the likelihood of the occurrence of a punt.

Post-rasterization Strip Complexity Over/Under Characterization

Figure 2:
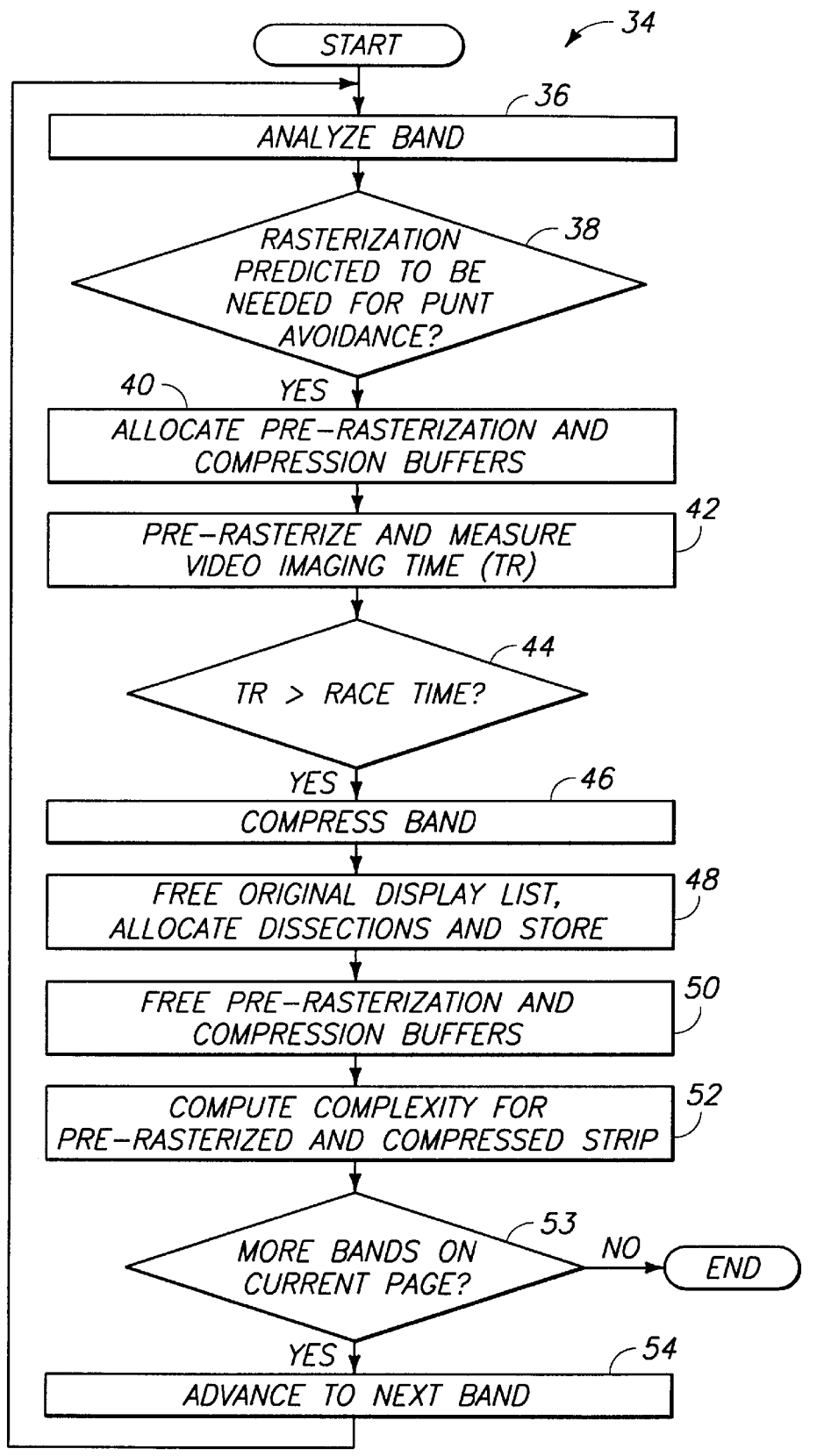
FIG. 2 is a flow diagram which describes an exemplary punt-protection algorithm.

Variance 60 is directed to the processing which takes place at step 52 in FIG. 2. Here, if a strip is transformed or pre-rasterized and compressed and kept in that form, the complexity estimates are recomputed to reflect one or more rasterized, and typically compressed objects. When this strip is then rasterized in real time at 68 (FIG. 3), the rasterization time can be compared to the computed complexity 66 of the compressed strip. The variance can then be assessed as a minimum, average, and maximum variance. Accordingly, a decision can be made at that point as to the amount of guard band protection to be used around this variance or, more accurately, the parameter giving rise to this variance.

Facilitating Data Flow Through the Image-Processing Pipeline

Figure 4:
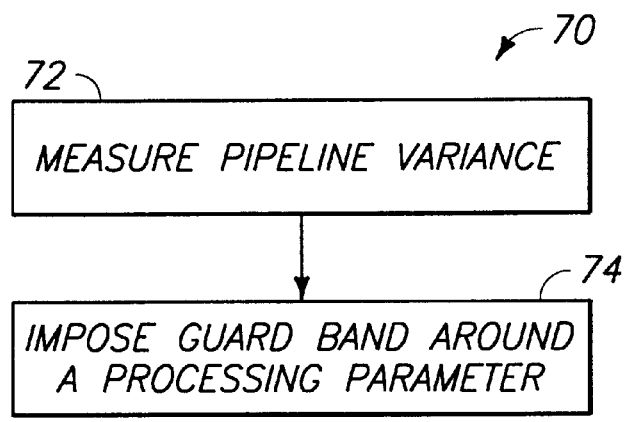
FIG. 4 is a flow diagram which illustrates a method in accordance with one or more embodiments of the present invention.

FIG. 4 shows a flow diagram 70 which describes a method in accordance with one or more embodiments of the present invention. Method 70 is suitable for use in a peripheral unit having an image-processing pipeline for processing image data which is to appear as a printed output. In a preferred embodiment, the peripheral unit comprises a laser jet printer system, exemplary ones of which are manufactured and sold by the assignee of this disclosure.

Method 70 preferably facilitates data flow through the image-processing pipeline. At 72, at least one image-processing pipeline variance is measured. Exemplary variances are described above. At 74, and responsive to the measuring that takes place at 72, a guard band is imposed around a processing parameter of the image-processing pipeline. The processing parameter(s) around which the guard band is imposed is preferably one which gives rise to the variance or, one relative to which the variance arises. For example, referring to FIG. 2, there are three discussed areas relative to which variances can arise. The first area concerns the initial assessment of the complexity of a strip at 38. Here, the parameter around which the guard band is placed can be considered as the complexity assessment. Specifically, when the complexity is initially determined, guard banding provides a degree of tolerance between the computed complexity and the actually-observed and measured pre-rasterization. The second area is concerned with variances in the pre-rasterization time versus the real time rasterization time. Here, guard banding around the pre-rasterization parameter computed at step 42 provides a degree of tolerance between the actual pre-rasterization time and the real time rasterization time. The third area is concerned with variances in the computed complexity of compressed strips versus the real time rasterization time of such strips. Guard banding around the computed complexity of the compressed strips parameter provides a degree of tolerance between the computed complexities and the real time rasterization time. In one embodiment, the measurement of the pipeline variance at 72 comprises measuring at least one rasterization parameter.

Figure 5:
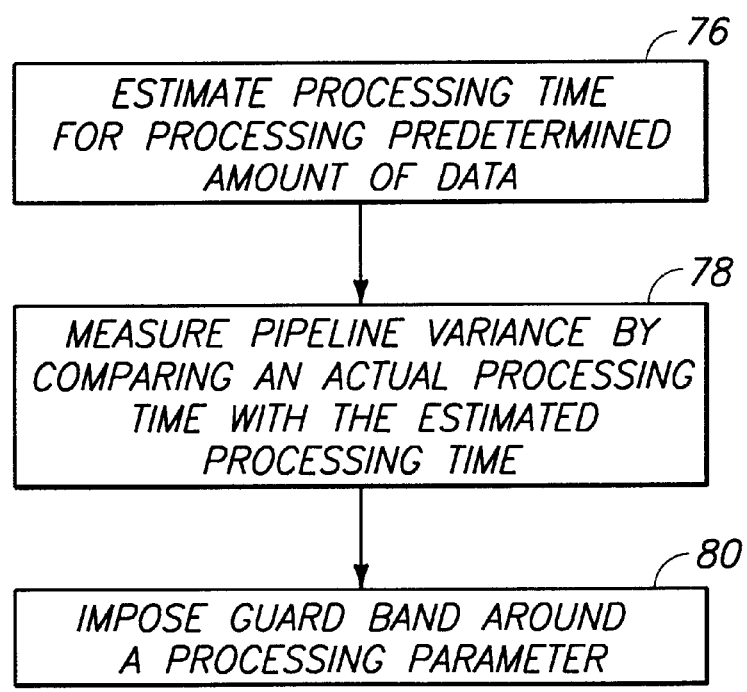
FIG. 5 is a flow diagram which illustrates a method in accordance with one or more embodiments of the present invention.

FIG. 5 shows a flow diagram in accordance with one or more embodiments of the present invention. At 76, processing time is estimated which pertains to processing of a predetermined amount of data through at least a portion of the image-processing pipeline. In the above example, an exemplary predetermined amount of data comprises a strip or band. The processing time estimation provides an estimated processing time. At 78, a pipeline variance is measured by comparing an actual processing time with the estimated processing time provided at 76. Responsive to the measurement of the pipeline variance at 78, a guard band is imposed at 80 around a processing parameter of the image-processing pipeline.

In one embodiment, estimation of the processing time at 76 comprises computing a complexity measure of the predetermined amount of data to provide the estimated processing time. A comparison is then made which compares an actual pre-rasterizing time of the predetermined amount of data with the estimated processing time. In this example, such coincides with variance 56 (FIG. 3). In another embodiment, estimation of processing time comprises pre-rasterizing the predetermined amount of data to provide the estimated processing time. A comparison is then made by comparing an actual rasterizing time of the predetermined amount of data with the estimated processing time. Such coincides with variance 58 (FIG. 3). In yet another embodiment, the predetermined amount of data is compressed to provide a compressed predetermined amount of data. Decompression of the predetermined amount of data coincides with the inverse of the processing which is described in FIG. 2 at 46. In this embodiment, the processing time estimation comprises computing a complexity measure of the compressed predetermined amount of data to provide an estimated processing time to decompress the strip at the image processor 30 of FIG. 1. Such coincides with processing which takes place at 52 (FIG. 2). A comparison is then effected by comparing an actual decompression time of the compressed predetermined amount of data with the estimated processing time derived from the computed complexity of the compressed predetermined amount of data. Such coincides with variance 60 (FIG. 3).

Provision of Data Structure

Figure 6:
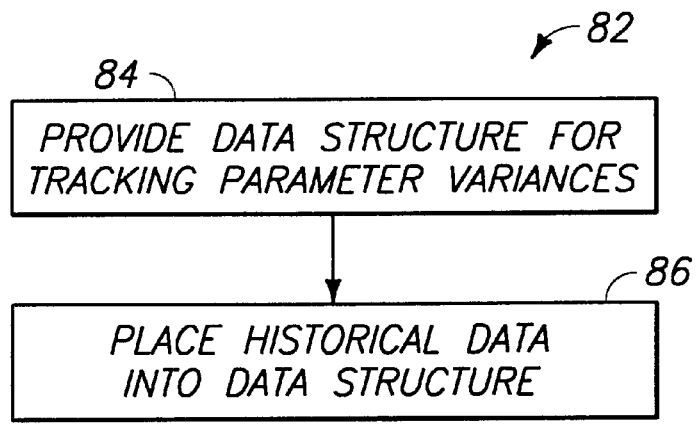
FIG. 6 is a flow diagram which illustrates a method in accordance with one or more embodiments of the present invention.

FIG. 6 shows a flow diagram generally at 82 in accordance with another embodiment of the invention. At 84, a data structure is provided for tracking parameter variances. At 86, historical data pertaining to processing of a plurality of predetermined amounts of data, e.g. strips, is placed into the data structure and utilized during the measurement(s) which take place relative to the image-processing pipeline variance.

Figure 7:
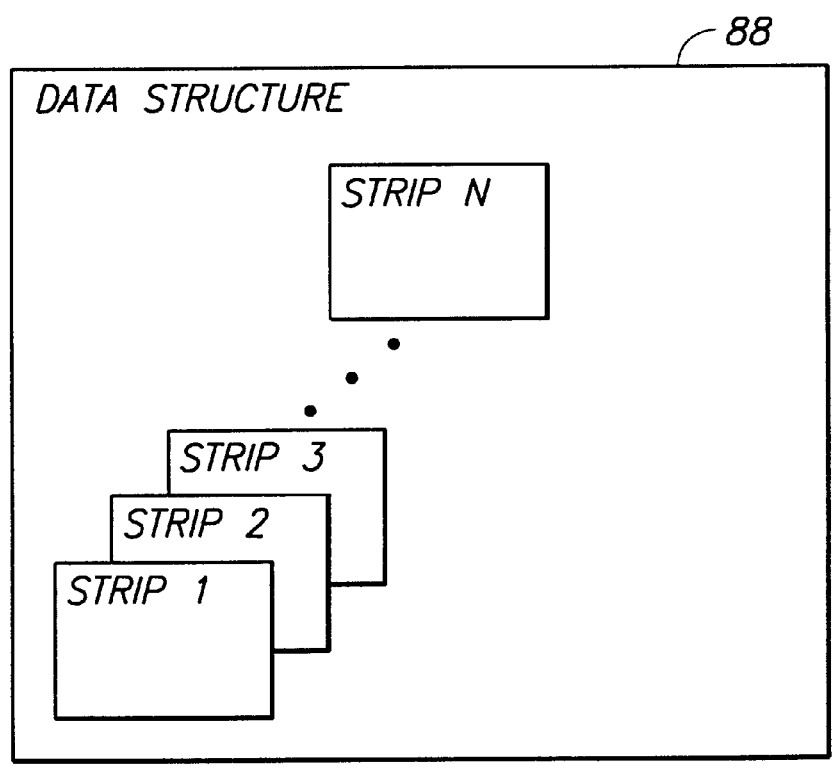
FIG. 7 shows an exemplary data structure provided in accordance with one or more embodiments of the present invention.

FIG. 7 shows an exemplary data structure at 88. Preferably, instrumentation within the peripheral unit's, e.g. laser printer's operating firmware uses a compact data structure containing historical data of all of the strips. In this example, the strips are represented by strip 1 through strip N.

Figure 8:
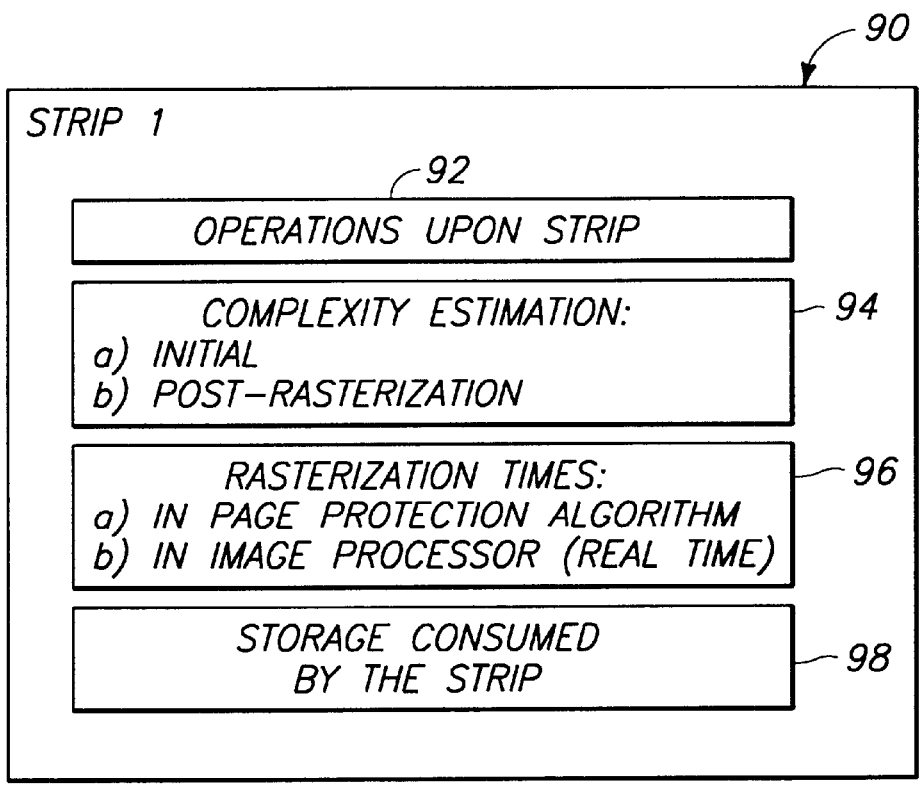
FIG. 8 is a more detailed view of the data structure of FIG. 7.

FIG. 8 shows a representation generally at 90 of exemplary historical data which can be contained within data structure 88 (FIG. 7). The historical data can include at 92, all of the operations performed upon the strips, the computed complexities 94, the rasterization times 96, and the storage consumed by the strip throughout the lifetime of the strip in the printer at 98.

Various embodiments of the invention can use strip-tracking instrumentation which implements techniques of instrumenting for important strip information, while minimizing the performance overhead associated with the information collected. For example, strip data can be collected in real time with transmission thereof being deferred to a performance output device until after performance-critical times have passed, e.g. usually at the end of a print job. Since the transmission of the data to the performance output device is typically very disruptive to the performance of the system insofar as impacting microprocessor cycles and disrupting the microprocessor cache system, this technique can reduce, by many orders of magnitude, the overhead associated with strip tracking instrumentation. In addition, whenever possible, strip data is collected into meaningful statistics instead of a complete set of data points. This enables the minimization of data storage needs of the strip instrumentation system.

In accordance with various embodiments of the present invention, statistics can be used to manage the occurrences, minimums, maximums, averages, and sums of the important strip parameters and variances with only modest storage requirements.

Worst Case Analysis

Figure 9:
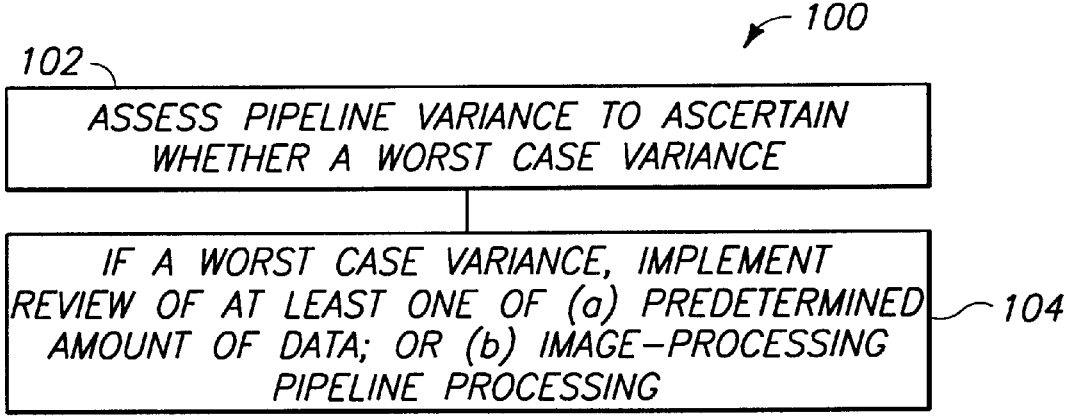
FIG. 9 is a flow diagram which describes a method in accordance with one or more embodiments of the present invention.

FIG. 9 shows a flow diagram generally at 100 in accordance with another embodiment of the invention. At 102, one or more pipeline variances can be assessed to ascertain whether the variance is a worst-case variance. At 104, if the variance is a worst-case variance, a review can be implemented of at least one of (a) an associated predetermined amount of data, e.g. strip, responsible for generating the worst-case variance, or (b) the processing which takes place in an image processing pipeline. This provides a troubleshooting aspect in which excessive variances can be traced to root-cause solutions. For example, in the first performance trace of a selection of print jobs, the worst-case variances and the associated job, page, and strip can be marked and recorded by strip-tracking instrumentation within the operating firmware. On subsequent instrumentation runs of the print jobs, more in-depth tracing of the system's behavior can be enabled during any rasterization of those strips previously marked as exhibiting a worst-case variance. The more in-depth tracing of these strips can include, but is not limited to: (1) the objects contained in the strip along with the statistical collection of their rendering times, minimum, maximum, and averages, (2) the context switching of the operating system, to pinpoint any cycle-stealing from the rendering task, (3) and the number of compressions, decompressions, types of compressions/decompressions, and statistics of the decompression times during the rendering.

Detection of Legitimate Case Variances

In add ition, aspects of the invention can provide instrumentation which detects legitimate cases for variances, and eliminates them from the consideration of worst-case variances. Examples of such can include: (1) initial strip complexity underestimation when the underestimation is due to the fact that the lower priority pre-rasterization has an elongated duration because a higher-priority rasterization has pre-empted it; (2) pre-rasterization to real time rasterization advance when the pre-rasterization has been legitimately slowed due to preemption by a higher-priority rasterization process.

Guard-Banding in a Digital Printer Image-Processing Pipeline

Figure 10:
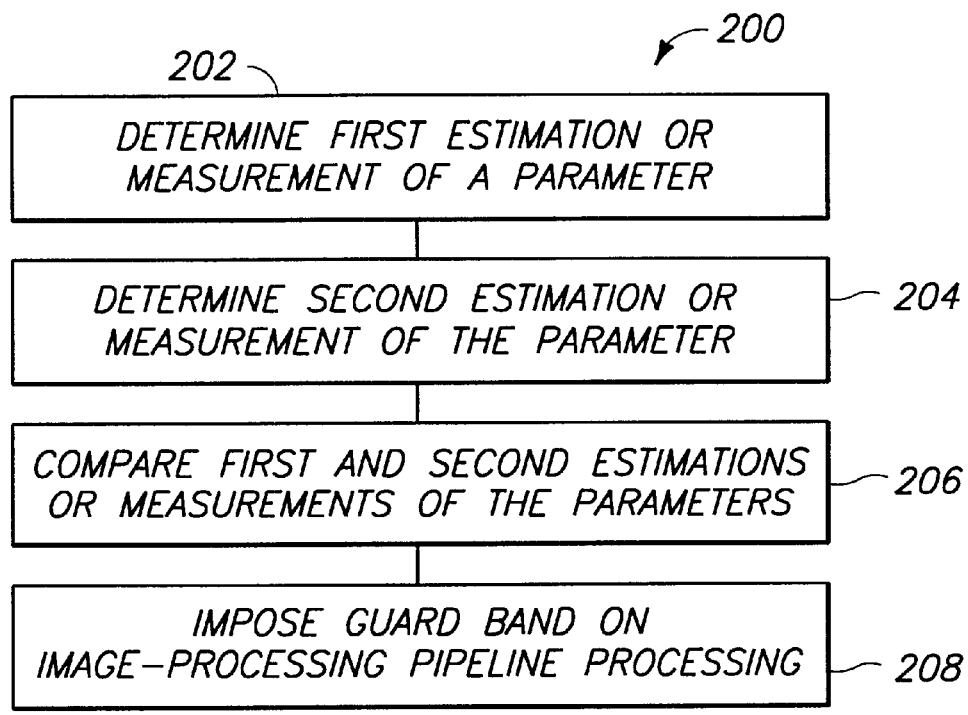
FIG. 10 is a flow diagram which describes a method in accordance with one or more embodiments of the present invention.

FIG. 10 shows a flow diagram, generally at 200, which describes a method in accordance with one or more embodiments of the present invention. The method is preferably utilized in connection with a digital printer having an image-processing pipeline for processing image data which is to appear as a printed output. The method preferably provides guard-banding for real time image-data processing.

At 202, a first parameter is determined relating to processing of a predetermined amount of data through the image-processing pipeline. At 204, a second parameter is determined relating to processing of the predetermined amount of data through the image-processing pipeline. The second parameter is preferably related to the first parameter. At 206, the first and second parameters are compared. At 208, and responsive to the comparison which takes place at 206, a guard band is imposed on at least a portion of the processing which takes place in the image-processing pipeline. In a preferred embodiment, at least one of the first and second parameters comprises a rasterization time. Exemplary rasterization times and exemplary methods through which such are determined are described above.

Figure 11:
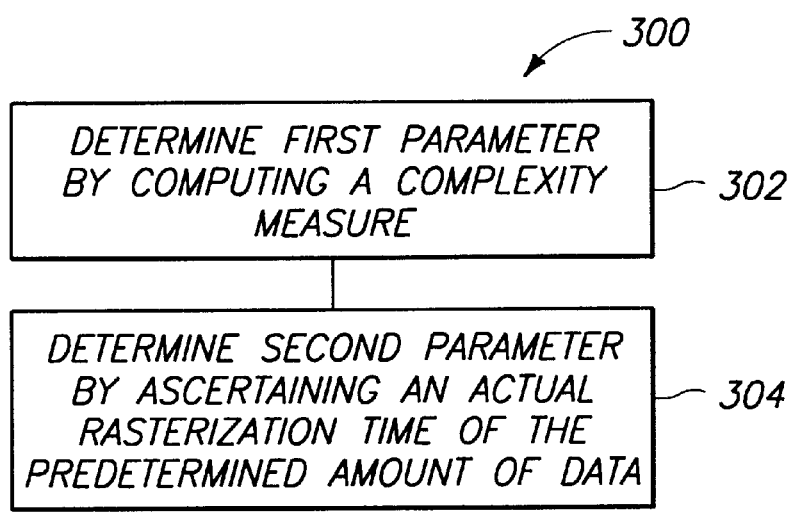
FIG. 11 is a flow diagram which describes a method in accordance with one or more embodiments of the present invention.

FIG. 11 shows a flow diagram generally at 300 in accordance with another embodiment of the invention. At 302, a first parameter relating to processing of a predetermined amount of data is determined by computing a complexity measure which describes an estimated rasterization time for the predetermined amount of data. At 304, determination of the second parameter comprises ascertaining an actual rasterization time of the predetermined amount of data. Comparison of the parameters and imposition of a guard band can take place as described above in connection with FIG. 10.

FIG. 12 shows a flow diagram generally at 400 in accordance with another embodiment of the invention. At 402, a determination of the first parameter takes place by ascertaining an actual pre-rasterizing time of the predetermined amount of data. At 404, the determination of the second parameter comprises ascertaining an actual rasterization time of the predetermined amount of data. Comparison of the first and second parameters and the imposition of an appropriate guard band can take place as described above in connection with FIG. 10.

FIG. 13 shows a flow diagram generally at 500 in accordance with another embodiment of the present invention. At 502, a predetermined amount of data is compressed prior to determining the first and second parameters. Accordingly, such provides a compressed predetermined amount of data. At 504, determination of the first parameter takes place by computing a complexity measure which describes an estimated rasterization time for the compressed predetermined amount of data. At 506, determination of the second parameter comprises ascertaining an actual rasterization time of the compressed predetermined amount of data. Comparison of the first and second parameters and imposition of an appropriate guard band can take place as described above in connection with FIG. 10.

Guard Band Adjustment, Dynamic and On-The-Fly Adjustment

Figure 14:
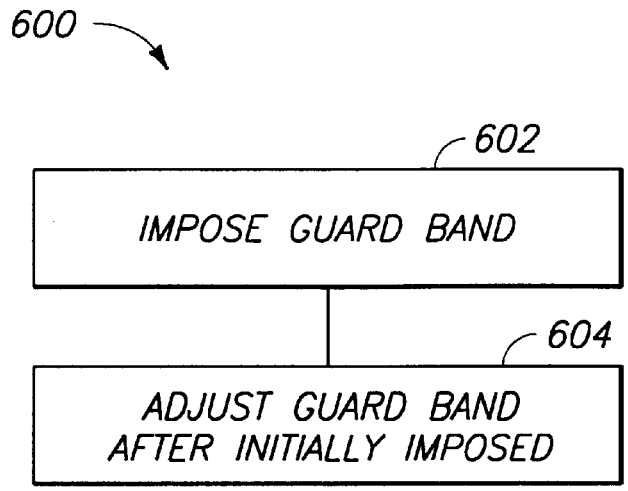
FIG. 14 is a flow diagram which describes a method in accordance with one or more embodiments of the present invention.

FIG. 14 shows a flow diagram generally at 600 in accordance with one preferred embodiment of the invention. At 602 a guard band is imposed as described above. After imposition of an appropriate guard band, the guard band can be adjusted at 604, in accordance with changes in the determined parameters or measured variances. For example, much if not all of the above-described processing can take place when a peripheral unit is initially calibrated at the factory. Such processing can provide pre-calibrated, pre-set peripheral units which are much less likely to encounter a situation where an overrun or punt can occur. Yet the possibility can still exist. The embodiment described just below provides added flexibility in that pre-set guard bands are not locked in place, but can be changed, preferably dynamically, to address variances which are different from those variances utilized to initially calibrate the system.

The adjustment of the guard bands can be conducted relative to any of the above-described variances, or other variances which are not specifically discussed but which will be apparent to those of skill in the art.

For example, and using the initial strip over/under characterization variance 56 (FIG. 3) as an example, such variance can be monitored during actual printer operation and the guard band associated therewith adjusted in a safer direction in accordance with its monitoring. The monitoring can be implemented through the use of any suitable software, hardware or firmware. As an example, an initial guard band can be set as described above. This results in a fixed, compile-time-set guard band for the initial strip complexity underestimation. This value is used as an initial value for each page processed. During the page punt protection process, existing pre-rasterizations, and possibly additionally-sampled pre-rasterizations are used to test the initial strip complexity underestimation, and compare this variance to the guard band set at compile-time. The existing pre-rasterization samples are obtained essentially free of performance cost and consist of those strips that are pre-rasterized by the normal punt protection processes and any strips that are pre-rasterized and pre-buffered before starting the race-the-laser real time rendering process. Additionally sampled pre-rasterizations may have a performance cost, particularly on the first page of a job, where the punt protection algorithm is the critical performance path. This can, however, be kept low by keeping the number of additional samples low, e.g. selecting the first non-buffered strip, and then every tenth one thereafter to incur only a modest cost, yet provide an adequate sampling for increased punt safety.

If the guard band is inadequate for this page via any of the samples used, then the guard band can be adjusted to an adequate value and maintained until it is determined or proven inadequate by a subsequent sample in the page, or until a new page is processed. Moreover, so-called legitimate cases for strip complexity underestimation can be eliminated when the underestimation is due to the fact that a lower priority pre-rasterization has an elongated duration because a higher-priority rasterization has preempted it. Preferably, the guard bands can be adjusted "on-the-fly" by monitoring every page and adjusting the guard bands when appropriate, as in one embodiment of this invention.

Figure 15:
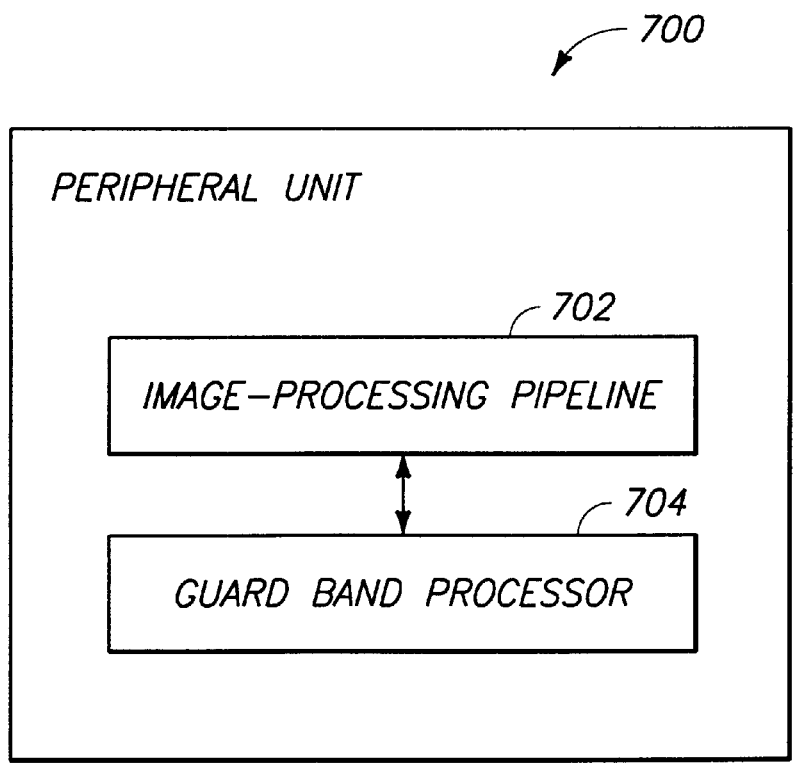
FIG. 15 is a high-level diagram of a peripheral unit in accordance with one or more embodiments of the present invention.

FIG. 15 shows an exemplary peripheral unit generally at 700. Peripheral unit 700 can be implemented in any suitable hardware, software, or firmware. Peripheral unit 700 includes an image processing pipeline 702 which is configured to receive image data and process the image data into a rasterized bit map. A guard band processor 704 is provided and is operably coupled with the image-processing pipeline. Although the guard band processor is shown as a separate element in the figure, such is not intended to suggest that the guard band is only a separate element. Specifically, the guard band processor can be implemented separately from, or integrally with the image-processing pipeline. In a preferred embodiment, the guard band processor shares the processor and the code of the image-processing pipeline. Guard band processor 704 can be implemented in any suitable hardware, software, or firmware. Preferably, guard band processor 704 is configured to measure at least one image-processing pipeline variance. Exemplary variances are discussed above. Guard band processor 704 is preferably configured to generate a guard band responsive to the measuring of the variance, and impose the guard band on at least a portion of the processing which takes place in the image processing pipeline. In one embodiment, the guard band processor 704 is configured to measure an image-processing pipeline variance comprising at least one rasterization parameter. In another embodiment, the guard band processor 704 is configured to estimate a processing time which pertains to processing of a predetermined amount of data through at least a portion of the image-processing pipeline. Such provides an estimated processing time. The guard band processor is further preferably configured to measure at least one image-processing variance by comparing an actual processing time with the estimated processing time.

In one embodiment, the guard band processor 704 is configured to estimate the processing time by computing a complexity measure of the predetermined amount of data to provide the estimated processing time. In one preferred embodiment, the actual processing time comprises an actual rasterizing time of the predetermined amount of data.

In one embodiment, the guard band processor is configured to adjust the guard band after it is imposed on the processing portion of the image-processing pipeline. In another embodiment, guard band processor 704 is configured to monitor processing which takes place in the image-processing pipeline, and responsive to the monitoring, adjust the guard band.

Advantages of the various embodiments of the present invention described above include improvements in the rapid and accurate implementation of punt protection, punt-margin trouble-shooting, and performance-tuning of the punt protection algorithms. Performance can be effectively and efficiently tuned while preserving punt safety. In addition, various embodiments of the invention can be very effective at significantly increasing punt safety with a minimal, if any, impact on performance cost. Additionally, improvements can be attained over various fixed guard bands by providing for their adjustment during printer operation.

What is claimed is:

1. In a peripheral unit having an image-processing pipeline for processing image data which is to appear as a printed output, a method for protecting image-data processing during real time processing through the image-processing pipeline comprising:

measuring at least one image-processing pipeline variance; and responsive to said measuring, imposing a guard band around a processing parameter of the image-processing pipeline.

2. The method of claim 1, wherein said measuring of said at least one image-processing pipeline variance comprises measuring at least one rasterization parameter.

3. The method of claim 1 further comprising estimating a processing time which pertains to processing of a predetermined amount of data through at least a portion of the image-processing pipeline to provide an estimated processing time; and wherein said measuring comprises comparing an actual processing time with said estimated processing time.

4. The method of claim 3, wherein said estimating comprises computing a complexity measure of said predetermined amount of data to provide said estimated processing time; and said comparing comprises comparing an actual pre-rasterizing time of said predetermined amount of data with said estimated processing time.

5. The method of claim 3, wherein said estimating comprises pre-rasterizing a predetermined amount of data to provide said estimated processing time; and said comparing comprises comparing an actual rasterizing time of said predetermined amount of data with said estimated processing time.

6. The method of claim 3 further comprising compressing a predetermined amount of data to provide a compressed predetermined amount of data, and wherein said estimating comprises computing a complexity measure of said compressed predetermined amount of data to provide said estimated processing time; and said comparing comprises comparing an actual rasterizing time of said compressed predetermined amount of data with said estimated processing time.

7. The method of claim 1 further comprising:

providing a data structure; and placing into the data structure historical data pertaining to processing of a plurality of predetermined amounts of data which are processed through the image-processing pipeline, said historical data being utilized during said measuring of said at least one image-processing pipeline variance.

8. The method of claim 7 further comprising assessing said at least one image-processing pipeline variance to ascertain whether said variance is a worst-case variance, and responsive to said variance being a worst-case variance, implementing a review of at least one of (a) an associated predetermined amount of data responsible for generating said worst-case variance, or (b) the processing which takes place in the image-processing pipeline.

9. In a digital printer having an image-processing pipeline for processing image data which is to appear as a printed output, a method for protecting image-data processing during real time processing through the image-processing pipeline comprising:

determining a first parameter relating to processing time of a predetermined amount of data through the image-processing pipeline;

determining a second parameter relating to processing time of the predetermined amount of data through the image-processing pipeline, the second parameter being related to the first parameter;

comparing the first and second parameters; and responsive to said comparing of the first and second parameters, imposing a guard band on at least a portion of the processing which takes place in the image-processing pipeline.

10. The method of claim 9, wherein at least one of the first and second parameters comprises a rasterization time.

11. The method of claim 9, wherein said determining of said first parameter comprises computing a complexity measure which describes an estimated rasterization time for said predetermined amount of data; and wherein said determining of said second parameter comprises ascertaining an actual rasterization time of said predetermined amount of data.

12. The method of claim 9, wherein said determining of said first parameter comprises ascertaining an actual pre-rasterizing time of said predetermined amount of data; and wherein said determining of said second parameter comprises ascertaining an actual rasterization time of said predetermined amount of data.

13. The method of claim 9 further comprising compressing said predetermined amount of data prior to determining said first and second parameters to provide a compressed predetermined amount of data; and wherein said determining of said first parameter comprises computing a complexity measure which describes an estimated decompression time for said compressed predetermined amount of data, and wherein said determining of said second parameter comprises ascertaining an actual decompression time of said compressed predetermined amount of data.

14. The method of claim 9 further comprising after said imposing, adjusting the guard band.

15. The method of claim 14, wherein said adjusting takes place dynamically.

16. The method of claim 14, wherein said adjusting takes place on-the-fly.

17. A peripheral unit comprising:
- an image-processing pipeline configured to receive image data and process said image data into a rasterized bitmap; and
- a guard band processor operably coupled with the image-processing pipeline and configured to measure at least one image-processing pipeline variance, generate a guard band responsive to measuring the variance, and impose said guard band on at least a portion of processing which takes place in the image-processing pipeline.

18. The peripheral unit of claim 17, wherein the guard band processor is implemented as an integral part of the image-processing pipeline.

19. The peripheral unit of claim 17, wherein the guard band processor is configured to measure an image-processing pipeline variance comprising at least one rasterization parameter.

20. The peripheral unit of claim 17, wherein the guard band processor is configured to estimate a processing time which pertains to processing of a predetermined amount of data through at least a portion of the image-processing pipeline to provide an estimated processing time; and wherein the guard band processor is further configured to measure said at least one image-processing variance by comparing an actual processing time with said estimated processing time.

21. The peripheral unit of claim 20, wherein the guard band processor is configured to estimate the processing time by computing a complexity measure of said predetermined amount of data to provide said estimated processing time; and wherein the actual processing time comprises an actual rasterizing time of said predetermined amount of data.

22. The peripheral unit of claim 17, wherein the guard band processor is configured to adjust the guard band.

23. The peripheral unit of claim 22, wherein the guard band processor is configured to monitor processing which takes place in the image-processing pipeline, and responsive thereto adjust the guard band.

* * * * *